United States Patent
Lee et al.

[19]

[11] Patent Number: 6,160,702
[45] Date of Patent: Dec. 12, 2000

[54] MULTIPLE SUB-BATTERY SYSTEM FOR A PORTABLE COMPUTER

[75] Inventors: Chun-Soo Lee; Jae-Wook Kim, both of Suwon, Rep. of Korea

[73] Assignee: SamSung Electronics Co., Ltd., Suwon, Rep. of Korea

[21] Appl. No.: 09/219,871

[22] Filed: Dec. 24, 1998

[30] Foreign Application Priority Data

Dec. 29, 1997 [KR] Rep. of Korea ..................... 97-77275

[51] Int. Cl.[7] ........................................... G06F 1/16
[52] U.S. Cl. ........................................... 361/683; 429/99
[58] Field of Search .................. 361/683; 364/708.1; 429/97, 98, 99

[56] References Cited

U.S. PATENT DOCUMENTS

| 5,015,546 | 5/1991 | Dulaney et al. ................. 429/99 |
| 5,058,045 | 10/1991 | Ma ................................. 364/708.1 |
| 5,122,927 | 6/1992 | Satou .............................. 429/99 |
| 5,148,042 | 9/1992 | Nakazoe . | |
| 5,251,105 | 10/1993 | Kobayashi et al. ............. 361/683 |
| 5,466,545 | 11/1995 | Chamberlain et al. ........... 429/99 |
| 5,483,437 | 1/1996 | Tang . | |
| 5,506,749 | 4/1996 | Matsuda ......................... 361/683 |
| 5,553,294 | 9/1996 | Nanno . | |
| 5,563,493 | 10/1996 | Matsuda et al. ................ 361/683 |
| 5,621,301 | 4/1997 | Allen . | |
| 5,784,626 | 7/1998 | Odaohara . | |

Primary Examiner—Leo P. Picard
Assistant Examiner—John Reed
Attorney, Agent, or Firm—Robert E. Bushnell, Esq.

[57] ABSTRACT

A portable computer that uses multiple sub-batteries, that are the collective equivalent of one regular computer battery, that are serially connected to power a portable computer. The sub-batteries each contain a small number of battery cells and are connected to the main circuit board, or mother board, of the portable computer to supply power to the portable computer. An electric connecting means may be adapted for connecting two sub-batteries to the motherboard. The multiple sub-battery system allows a more flexible layout design for the installation of various internal components inside of the portable computer. Thus, the small sized battery seats can be placed in various, priorly unusable space, places. Now portions of the computer's battery system can be stored in the corners of the housing, or in narrow spots between other internal components.

12 Claims, 4 Drawing Sheets

MULTIPLE SUB-BATTERY SYSTEM FOR A PORTABLE COMPUTER

CLAIM OF PRIORITY

This application makes reference to, incorporates the same herein, and claims all rights accruing thereto under 35 U.S.C. §119 through my patent application entitled Multi-Unit Battery Pack and System Using the Same earlier filed in the Korean Industrial Property Office on Dec. 29, 1997 and there duly assigned Ser. No. 1997/77275.

BACKGROUND OF THE INVENTION

1. Field of the Invention

The present invention relates, in general, to a battery pack for portable electronic systems and, more particularly, to a multi-unit battery pack comprising a plurality of small-sized single-unit battery packs, individually consisting of a small number of unit battery cells. The present invention also relates to a system designed for installing the single-unit battery packs in separate small seats of a main body, thus allowing a more flexible layout of an installation area for auxiliary equipment and improving the designing flexibility of the main body.

2. Background Art

Recently, portable computers have become a popular alternative to traditional desktop computers in terms of their movability, simplicity, and various functions. Furthermore, various expansion devices have been developed that enable the portable computer to extend its battery life as well as its multimedia capabilities. This development has been spurred by users' desires to overcome the inherent functional limitations, with respect to size, weight, and battery life, of portable computers. Some common expansion devices, also referred to as peripheral devices, are, for example, external speakers, external CD-ROM drives, external batteries, or AC adapters. With the continuing trend toward miniaturization, many peripheral devices can now be included as internal components in a portable computer. However, to properly power a portable computer, and the internal components, the design of the battery is critical.

Some techniques for designing batteries for a portable computer are shown, for example, in U.S. Pat. No. 5,483,437 to Tang entitled Power Supply Arrangement for Notebook Computers, U.S. Pat. No. 5,621,301 to Allen entitled Connecting Multiple Batteries to Battery Powered Devices, U.S. Pat. No. 5,553,294 to Nanno entitled Portable Computer Powered by Rechargeable Batteries, U.S. Pat. No. 5,148,042 to Nakazoe entitled Small Electronic Device Capable of Switching Batteries by Releasing a Battery Locking Mechanism, and U.S. Pat. No. 5,784,626 to Odaohara entitled Battery Connecting Device for a Computer System and a Method of Switching Batteries. Each of the cited references has elements in common with the current invention.

While the laptop computer is being designed in a more miniature fashion, limitations are incurred by the fact that battery size has still remained fairly large. This results in laptops needing correspondingly large battery seats to accommodate the battery. Needing to devote a significant amount of continuous space inside a portable computer to supporting a battery leads to design and layout restrictions that make it more difficult to incorporate further components into the portable computer.

As such, I believe that the contemporary art can be improved by providing a portable computer that divides up one battery into multiple sub-batteries that are serially connected, that are mounted on smaller seats that are in different locations in the portable computer, that allows further integration of components into the portable computer, and that reduces the layout restrictions that must be accommodated when the portable computer is being designed.

SUMMARY OF THE INVENTION

Accordingly, it is an object of the present invention to provide an improved portable computer.

It is another object to provide a portable computer to provide a portable computer that uses multiple sub-batteries rather than one larger battery.

It is still another object to provide a portable computer that uses smaller battery seats that are separately spacable throughout the housing of the portable computer.

It is yet another object to provide a portable computer that allows manufacturers more flexibility in the design layout of the portable computer, thus facilitating the incorporation of additional internal components into the portable computer.

To achieve these and other objects, a portable computer is provided that uses multiple sub-batteries, that are the collective equivalent of one regular computer battery, that are serially connected to power a portable computer. The sub-batteries each contain a small number of battery cells and are connected to the main circuit board, or mother board, of the portable computer to supply power to the portable computer. An electric connecting means may be adapted for connecting two sub-batteries to the motherboard.

Wires can be used to serially connect the sub-batteries. This allows the multiple smaller sub batteries to be a functional equivalent to one regular computer battery. Alternatively four sub-batteries can be spaced throughout the portable computer to facilitate the integration of internal components into the portable computer. It should be understood that there is no reason that only four sub-batteries can be used. Eight or more sub-batteries can be used to further simplify the manufacturing of advance portable computers.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
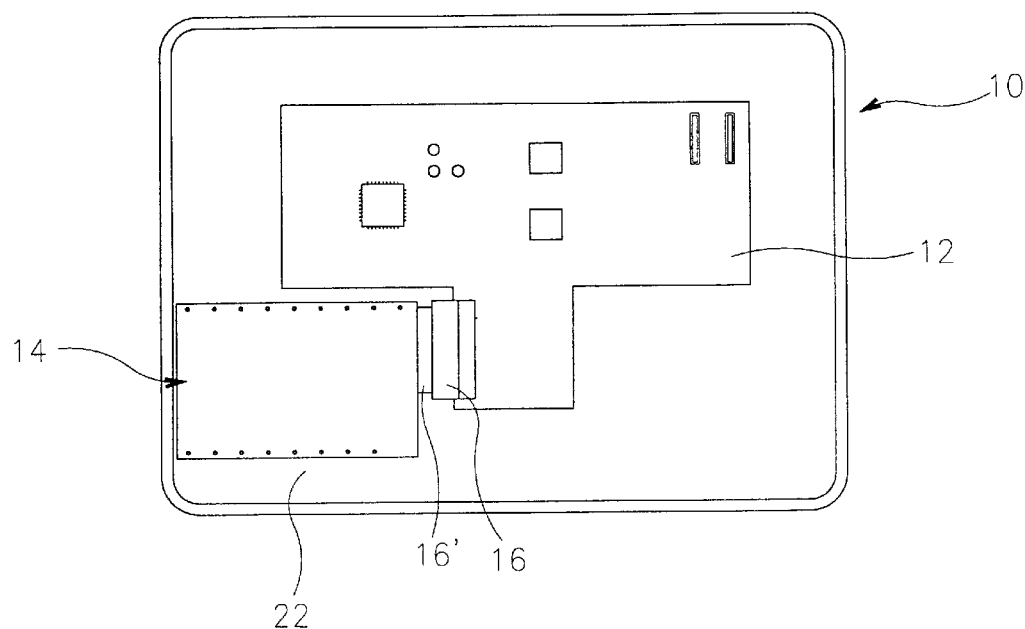
FIG. 1 is a plan view of the housing of a portable computer that uses a single battery pack installed on a seat inside the housing.

Turning now to the drawings, FIG. 1 illustrates portable computer housing, or main body, 10 with single battery 14 mounted on a battery seat inside the housing.

Figure 2:
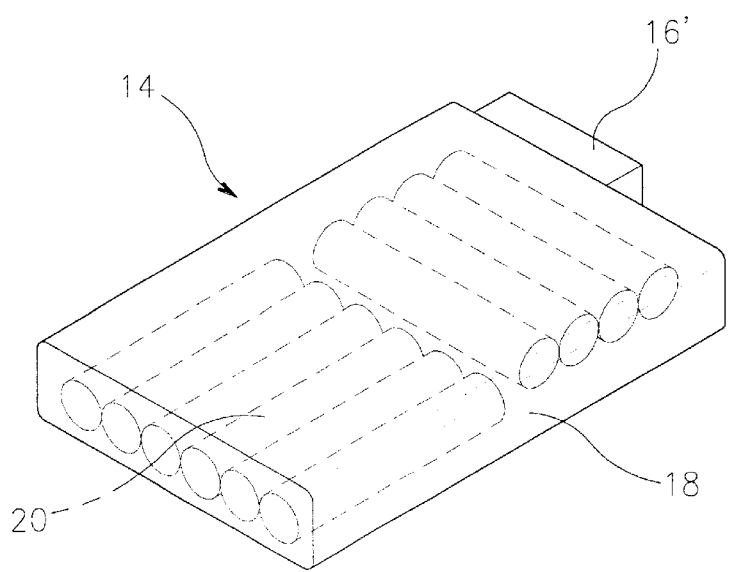
FIG. 2 is a perspective view showing the construction of the battery pack FIG. 1.

Motherboard, or main circuit board, 12 is arranged at a predetermined position inside main body 10 of the portable computer, while single battery 14 is installed on a battery seat, provided at a position around main circuit board 12. Thus allowing the computer to be used in any area independent from any concerns relating to the availability of an external power source. Battery pack 14 is electrically connected to circuit board 12 through connectors 16 and 16'. FIG. 2 is a perspective view showing the construction of a large-sized single-unit battery. This is the sort of battery shown in FIG. 1. As can be seen, the use of a single battery requires that a large portion of continuous space within the housing be devoted to the battery. This results in less design freedom when incorporating other internal components into the design for the portable computer.

As shown in FIG. 2, battery pack 14 comprises a plurality of, for example, six to ten or more rechargeable battery cells 20, that are electrically interconnected to each other, in a serial fashion, and are regularly arranged inside casing 18. Thus, multiple independent battery cells are integrated into a large-sized single-unit battery. Connector 16' is used for electrically connecting battery pack 14 to connector 16 of main circuit board 12. Connector 16' is formed on the outside of casing 18.

Figure 3:
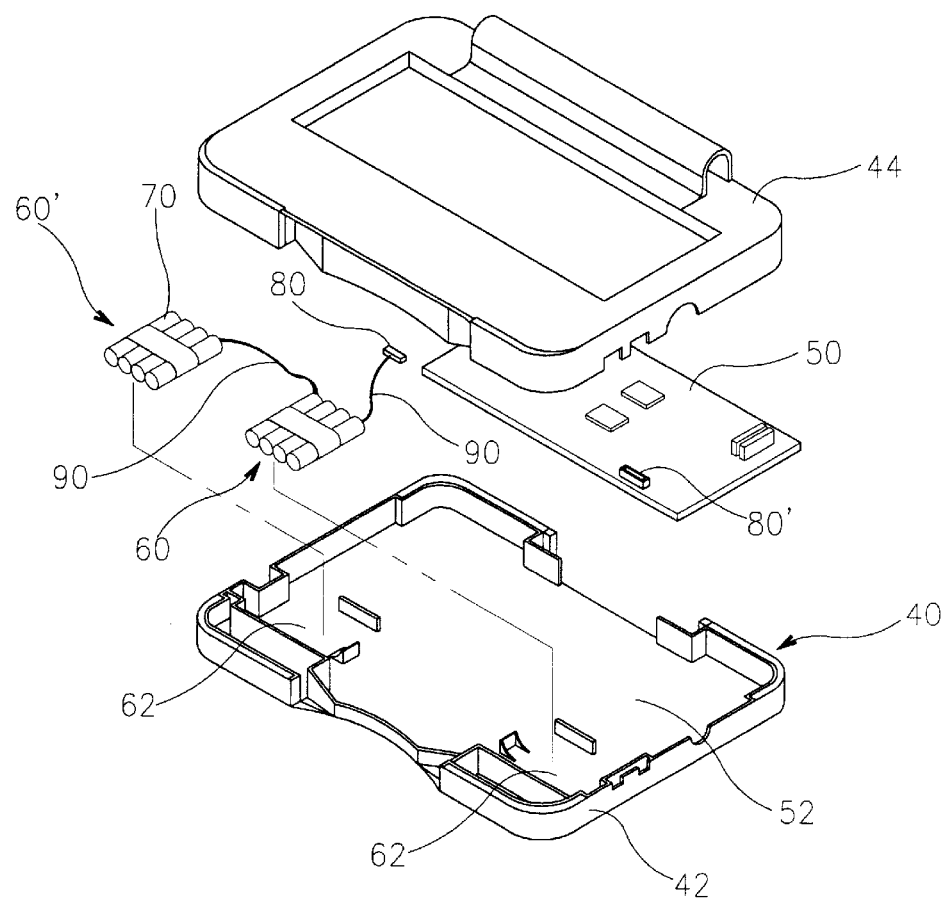
FIG. 3 is an exploded perspective view of the main body of a portable computer, with two sub-batteries installed on battery seats inside the housing of the portable computer, as constructed in accordance with the principles of the present invention.

FIG. 3 is an exploded perspective view of the housing, or main body, of a portable computer that has two sub-batteries as constructed in accordance with the principles of the present invention. It should be understood that the term "sub-batteries" as used in both the specification and the claims should be interpreted to mean "multiple batteries that collectively are the equivalent of one battery that would be regularly used with the portable computer." As such, the use of "sub-batteries" is different from merely using multiple regularly sized batteries. Redundant regular sized batteries merely extend the amount of usage a user would obtain without having to obtain fresh batteries. The use of "sub-batteries" gives the same amount of lifetime as would the use of one regular battery of a similar chemical construction. The difference between "sub-batteries" and multiple batteries is that all of the "sub-batteries" together are the collective equivalent of one battery, or one of multiple batteries. This is different from merely adding additional batteries to a computer. In specific, further miniaturization is possible while maintaining optimum design flexibility by reducing the size of continuous space that must be devoted to a battery. Housing 40 is constructed using upper housing 44 and lower housing 42. Lower housing 42 has battery seats 62 for engaging sub-batteries 60 and 60'. The two sub-batteries may be connected serially by wire 90. Each sub battery is made up of a few battery cells 70. Sub-batteries 60 and 60' are connected to motherboard 50 via connectors 80 and 80'.

The battery cells used in the present invention to power portable electronic systems, such as portable computers, are not integrated into a large-sized single-unit battery, but are grouped into two or more small-sized sub-batteries 60 and 60'. That is, unit battery cells 70 are divided into two groups, both groups being integrated into small-sized sub-batteries 60 and 60'. Sub-batteries 60 and 60' are seated on the small-sized battery seats 62 attached to bottom housing 42. Housing encloses sub-batteries 60 and 60' that are electrically interconnected, in a serial fashion, with each other, thus forming the multi-unit battery pack that is electrically connected to main circuit board 50 using two connectors 80 and 80'.

Figure 4:
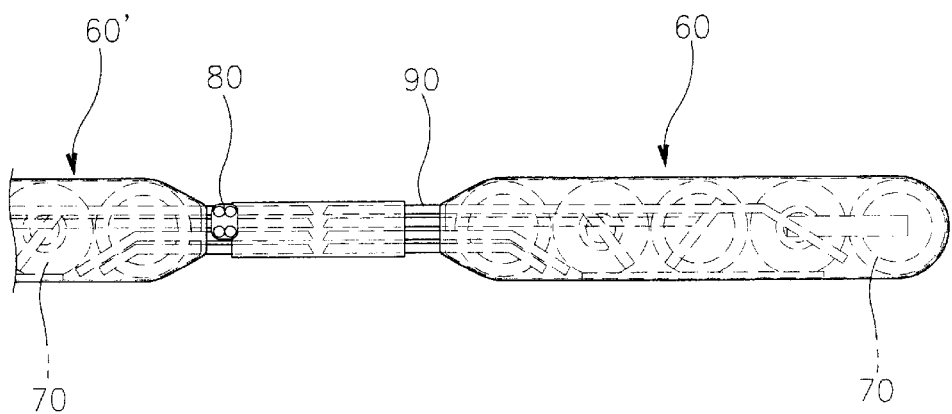
FIG. 4 is a front view of one sub-battery pack of FIG. 3.

FIG. 4 is a front view of the sub-batteries of FIG. 3. Sub-battery 60 is connected to sub-battery 60' via wire, or similar connector means, 90. Each of the sub-batteries is composed of a few battery cells 70 and are collectively connected to the motherboard using connector 80.

Figure 5:
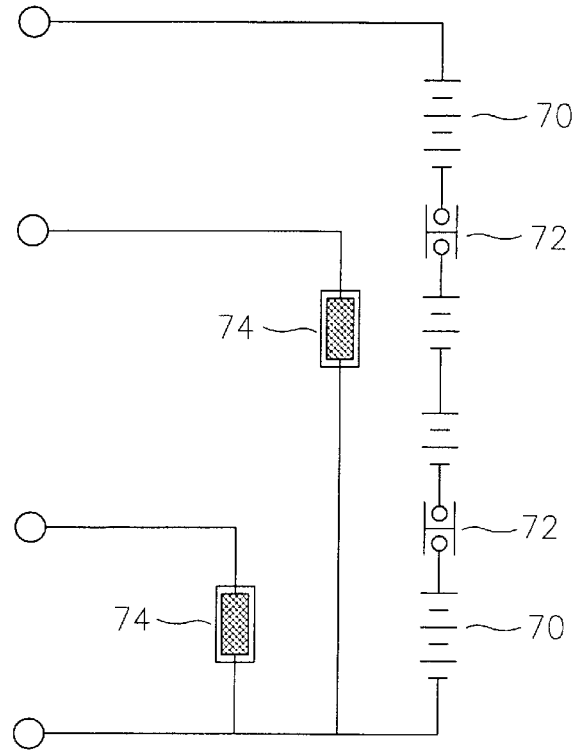
FIG. 5 is a circuit diagram of the sub-battery pack of FIG. 4.

FIG. 5 illustrates a circuit diagram of each sub-battery 60 and 60' of FIG. 4. Unit battery cells 70 of each pack 60 and 60' are interconnected to each other in series, with two thermostats 72 being mounted to wires attached to unit cells 70 that are used as an automatic temperature control means. In addition, two thermistors 74, each of which may be an electric resistor that has a resistance that varies in a positively correlated manner with the temperature. The thermistors are mounted to the circuit of each sub-battery 60 and 60' at a position around each terminal.

Figure 6:
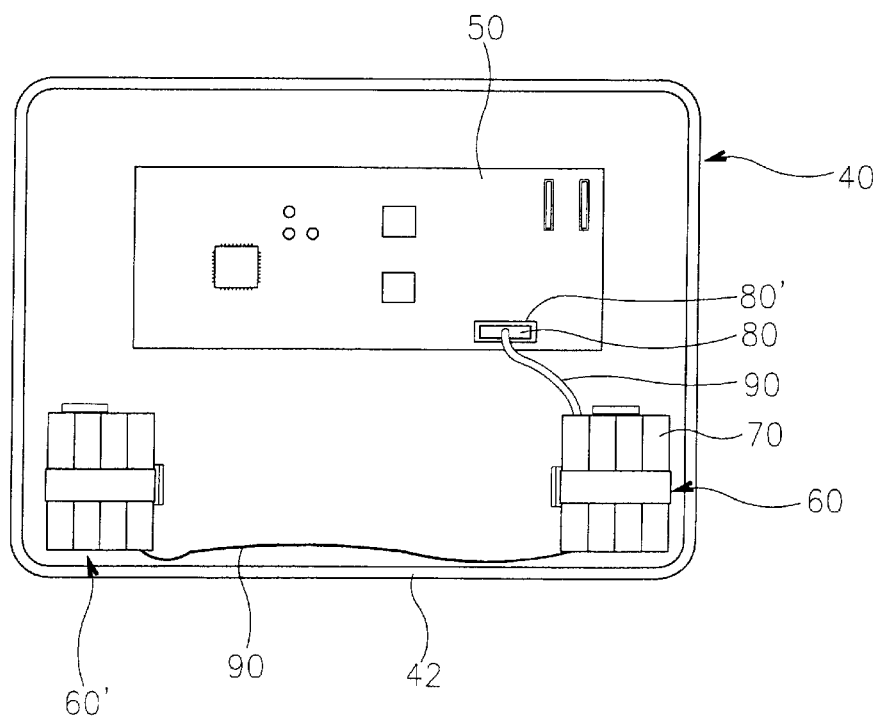
FIG. 6 is a plan view of the housing of a portable computer with the multiple sub-batteries of FIG. 3.

FIG. 6 is a plan view of the main body of a portable computer with multiple sub-batteries that are used to supply power to motherboard 50. Main circuit board 50 is fixedly seated on the circuit board seat 52 that is positioned on bottom housing 42 of portable computer housing 40.

In addition, two sub-batteries 60 and 60', that individually may each be made up of five, or fewer, unit battery cells 70, are seated on small battery seats 62 that are arranged around motherboard seat 52. When both motherboard 50 and sub-batteries 60 and 60' are completely seated on the appropriate seats 52 and 62 positioned on bottom housing 42, connector 80, which is connected to either one of sub-batteries 60 and 60', is brought into engagement with connector 80' of motherboard 50. Afterwards, the top of main body 40 is covered using top housing 44.

Figure 7:
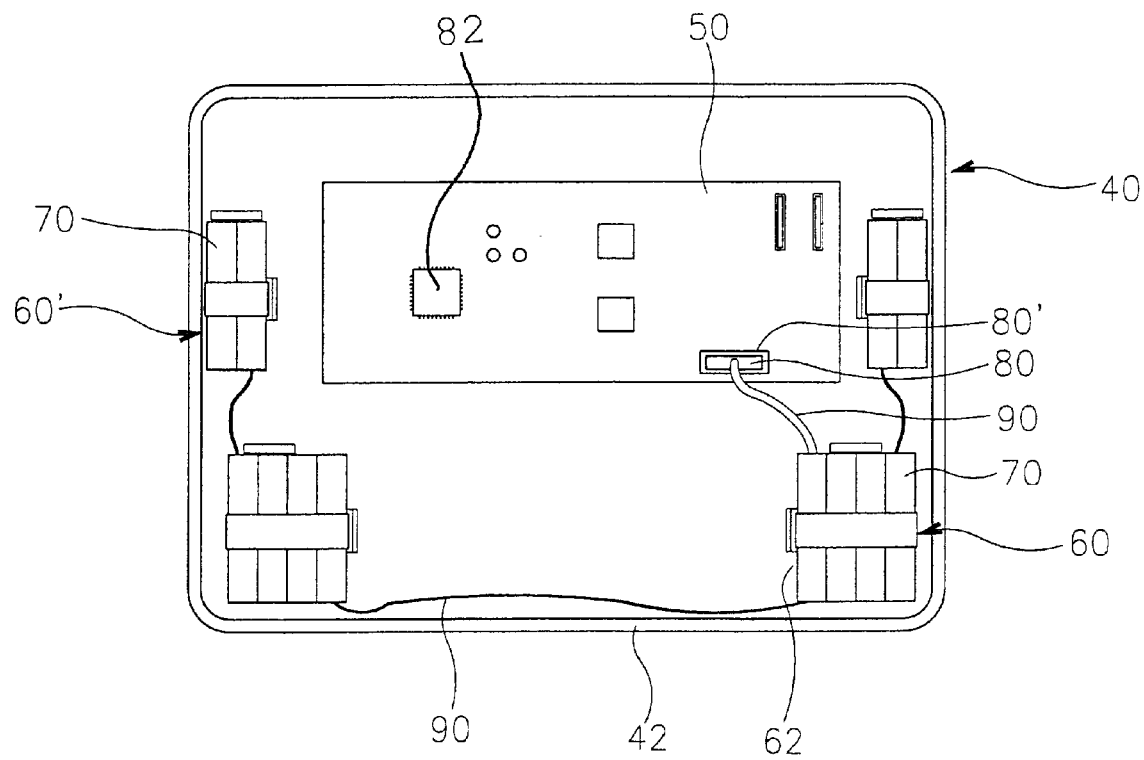
FIG. 7 is a plan view of the main body of a portable computer with a multi-unit battery pack in accordance with the second embodiment of this invention.

FIG. 7 is a plan view of the main body of a portable computer with multiple sub-batteries positioned in a spaced apart symmetric fashion inside of housing 40 of the computer. Main circuit board 50, that supports central processing unit 82, is fixedly seated on circuit board seat 52 that is positioned on bottom housing 42. In addition, four sub-batteries 60 and 60', that individually are constructed using two or four unit battery cells 70, are respectively seated on a plurality of small-sized battery seats 62 that are arranged around motherboard seat 52.

When both motherboard 50 and the four sub-batteries 60 and 60' are completely seated on seats 52 and 62 that are positioned on bottom housing 42, connector 80, that is connected to either sub-battery 60 or 60', is brought into engagement with connector 80' of main circuit board 50.

As described above, the present invention provides a system of multiple sub-batteries that may be used to power electronic systems, such as the portable computer described. The multiple sub-batteries of this invention may each be constructed using a few small-sized cells. Thus, each sub-battery individually consists of a small number of unit battery cells that are separately installed on small battery seats inside the housing of the portable computer. The multiple sub-battery system allows a more flexible layout design for the installation of various internal components inside of the portable computer. Thus, the small sized battery seats can be placed in various, priorly unusable space, places. Now portions of the computer's battery system can be stored in the corners of the housing, or in narrow spots between other internal components.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A portable computer, comprising:
    a battery for said portable computer, comprising:
        a first plurality of battery cells combined in seriatim to form a group of battery cells, the voltage across said group of battery cells being equal to the sum of the voltage across each of said first plurality of battery cells, and
        a second plurality of groups of battery cells, connected in seriatim, forming said portable computer battery, a voltage across said portable computer battery being equal to the sum of the voltages across each of said second plurality of groups of battery cells;
    a housing enclosing a central processing unit, a motherboard, and said battery for said portable computer;
    a second plurality of battery seats, each sized to support one of said second plurality of groups of battery cells, said second plurality of battery seats being disposed inside said housing of said portable computer; and
    said second plurality of groups of battery cells each being mounted in corresponding ones of said second plurality of battery seats and said second plurality of battery seats being separately spacable in a symmetrical fashion throughout an interior of said housing to facilitate the accommodation of said motherboard and a plurality of internal components installed in said interior of said housing of said portable computer.

2. A portable computer, comprising:
    a housing enclosing a central processing unit;
    a battery comprising:
        four sub-batteries, collectively equal to one regular battery, mounted in said housing and electrically interconnected in a serial fashion to supply power to said portable computer; and
        each one of said four sub-batteries containing a plurality of battery cells;
    four battery seats, each sized to support one of said plurality of sub batteries, mounted in said housing of said portable computer; and
    said four sub-batteries each being mounted on one of said plurality of battery seats and said plurality of battery seats separately spacable in a symmetric parallel fashion throughout said housing to facilitate the accommodation of a plurality of internal components installed in said housing of said portable computer.

3. The portable computer of claim 2, further comprising:
    a motherboard mounted in said housing and supporting said central processing unit;
    two of said four sub-batteries being relatively smaller sub-batteries positioned parallel to said motherboard on opposite sides of said motherboard; and
    two of said four sub-batteries being relatively larger sub-batteries each positioned in a corner of said housing.

4. The portable computer of claim 3, further comprised of each of said two relatively larger sub batteries having an attached thermistor.

5. A portable computer, comprising:
    a housing enclosing a motherboard and a central processing unit;
    a battery comprising:
        four sub-batteries, collectively equal to one regular battery, mounted in said housing and electrically interconnected in a serial fashion to supply power to said portable computer;
        each one of said four sub-batteries containing a plurality of battery cells;
        two of said four sub-batteries being relatively smaller sub-batteries positioned parallel to said motherboard on opposite sides of said motherboard; and
        two of said four sub-batteries being relatively larger sub-batteries each positioned in a corner of said housing;
    four battery seats, each sized to support one of said plurality of sub batteries, mounted in said housing of said portable computer; and
    said four sub-batteries each being mounted on one of said plurality of battery seats and said plurality of battery seats separately spacable in a symmetric parallel fashion throughout said housing to facilitate the accommodation of a plurality of internal components installed in said housing of said portable computer.

6. The portable computer of claim 5, further comprised of each of said two relatively larger sub batteries having an attached thermistor.

7. The portable computer of claim 1, wherein a first portion of said second plurality of groups of battery cells being disposed adjacent to said motherboard in said housing.

8. The portable computer of claim 1, wherein a second portion of said second plurality of groups of battery cells being disposed in a corner of said housing.

9. The portable computer of claim 7, wherein a second portion of said second plurality of groups of battery cells being disposed in a corner of said housing.

10. The portable computer of claim 8, wherein a third portion of said second plurality of groups of battery cells are attached to a thermistor.

11. A method of manufacturing a housing for a portable computer, comprising the steps of:
    constructing a lower housing casing and an upper housing casing that mates with said lower housing casing to produce an enclosure wherein electrical components can be stored within;
    fixing a motherboard of said portable computer having a central processing unit to said lower housing casing;
    distributing a first plurality of sub-batteries arranged in a plurality of distinct groups at a plurality of different corners within said lower housing casing not occupied by said motherboard;
    electrically connecting each sub-battery in seriatim to electrically form one larger battery;
    electrically connecting said larger battery to said motherboard to electrically operate said central processing unit on said motherboard; and
    attaching said upper housing casing to said lower housing casing resulting in said housing encompassing said motherboard and said motherboard being electrically attached to said larger battery comprised of said sub-batteries electrically connected in seriatim.

12. The method of claim 11, further comprising the step of distributing a second plurality of sub-batteries adjacent to said motherboard within said lower housing casing.

* * * * *